United States Patent [19]
Limberg

[11] Patent Number: 5,798,803
[45] Date of Patent: Aug. 25, 1998

[54] NTSC INTERFERENCE DETECTORS USING COMB FILTERS THAT SUPPRESS HDTV PILOT CARRIER FOR NTSC EXTRACTION

[75] Inventor: Allen LeRoy Limberg, Vienna, Va.

[73] Assignee: Samsung Electronics Co., Ltd., Suwon, Rep. of Korea

[21] Appl. No.: 724,800

[22] Filed: Oct. 2, 1996

[51] Int. Cl.$^6$ .................................................. H04N 5/38
[52] U.S. Cl. ........................ 348/726; 348/21; 348/607
[58] Field of Search ............................. 348/21, 731, 607, 348/470, 558, 555, 725, 726; 375/346, 348, 350

[56] References Cited

U.S. PATENT DOCUMENTS

| | | | |
|---|---|---|---|
| 5,260,793 | 11/1993 | Citta et al. | 358/167 |
| 5,479,449 | 12/1995 | Patel et al. | 375/316 |
| 5,512,957 | 4/1996 | Hulyalkar | 348/21 |
| 5,546,132 | 8/1996 | Kim et al. | 348/607 |
| 5,594,496 | 1/1997 | Nielsen et al. | 348/21 |
| 5,602,602 | 2/1997 | Hulyalkar | 348/21 |

Primary Examiner—Victor R. Kostak

[57] ABSTRACT

Post-coder selection circuitry uses an NTSC interference detector for controlling the selection of whether post-coding is to precede trellis decoding in an HDTV receiver. The NTSC interference detector includes an NTSC extracting filter for supplying an NTSC extracting filter response that separates accompanying co-channel interfering NTSC signal component from the received I-channel baseband signal including its direct bias component. The NTSC interference detector includes a comparing portion for periodically integrating the NTSC extracting filter response and deciding whether the co-channel interfering NTSC signal component from the I-channel baseband signal is above a first reference value or not. The NTSC interference detector also includes a control signal generator for accumulating the signal supplied from the comparing portion for each integration period, deciding the presence or absence of the co-channel interfering NTSC signal components according to a second reference value, and supplying a control signal having first or second condition according to the presence or absence respectively of the co-channel interfering NTSC signal component. A post-coder for the received I-channel signal is enabled in response to the first condition of the control signal and disabled in response to the second condition of the control signal.

18 Claims, 4 Drawing Sheets

NTSC INTERFERENCE DETECTORS USING COMB FILTERS THAT SUPPRESS HDTV PILOT CARRIER FOR NTSC EXTRACTION

The present invention relates to the digital high-definition television (HDTV) system used in the United States of America for terrestrial broadcasting, and more particularly, to post-coder selection methods and circuits for automatically determining whether a post-coder comb filter is or is not to be employed in the HDTV receiver.

BACKGROUND OF THE INVENTION

The digital HDTV signal transmitted in the United States of America by vestigial-sideband (VSB) amplitude modulation (AM) during terrestrial broadcasting comprises a succession of consecutive-in-time data fields each containing 314 consecutive-in-time data lines. Each line of data is preceded by a line synchronization code group of four symbols having successive values of +S, −S, −S and +S. The value +S is one level below the maximum positive data excursion, and the value −S is one level above the maximum negative data excursion. The lines of data are each of 77.7 microsecond duration, and there are 832 symbols per data line for a symbol rate of about 10 megabits/second. The initial line of each data field is a field synchronization code group that codes a training signal for channel-equalization and multipath suppression procedures. The training signal is a 511-sample pseudo-noise sequence (or "PN-sequence") followed by three 63-sample PN sequences. The middle one of these 63-sample PN sequences is transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a ⅔ rate trellis code with one uncoded bit. The interleaved trellis codes are subjected to two-dimensional Reed-Solomon forward error-correction coding, which provides for correction of burst errors arising from noise sources such as a nearby unshielded automobile ignition system. The Reed-Solomon coding results are transmitted as 8-level (3 bit) one-dimensional-constellation symbol coding, which is selectively precoded better to overcome NTSC co-channel interference. The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of the symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

An HDTV broadcaster is called upon to decide whether or not to use a precoder at the transmitter, which precoder provides for matched filtering of data together with a comb filter in each HDTV receiver, depending upon whether interference from a co-channel NTSC broadcasting station is expected or not. Precoding is not used for data line synchronization code groups or during data lines in which data field synchronization data is transmitted. Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not obtain if there are no co-channel NTSC broadcasting stations, of course. If there is likelihood of NTSC interference within his area of broadcast coverage, the HDTV broadcaster will probably use the precoder to concentrate HDTV transmission energy into portions of the frequency spectrum where it is more easily separated from NTSC interference; and, accordingly, a post-coder comb filter should be enabled in the HDTV receiver to complete matched filtering. If there is no possibility of NTSC interference or there is insubstantial likelihood thereof, in order that flat spectrum noise is less likely to cause erroneous decisions as to symbol values in the trellis decoder, the HDTV broadcaster preferably discontinues using the precoder; and, accordingly, the post-coder comb filter should then be disabled in each HDTV receiver.

U.S. Pat. No. 5,260,793 issued Nov. 9, 1993 to R. W. Citta et alii and entitled "RECEIVER POST CODER SELECTION CIRCUIT" selectively employs a post-coder comb filter for suppressing NTSC interference accompanying a real or in-phase baseband component (I channel) of the complex output signal of a demodulator used in a digital high-definition television (HDTV) receiver. The presence of NTSC interference in the I-channel component of the demodulator response is detected for developing control signals automatically to enable or disable the comb filter being used for suppressing NTSC co-channel interference. During each data field sync interval, the input signal to and the output signal from an NTSC suppression filter of comb filter type in the HDTV receiver are each compared with a respective signal that is known a priori and is drawn from memory within the HDTV receiver. If the minimum result of comparison with the input signal has less energy than the minimum result of comparison with the output signal from the NTSC suppression filter, this is indicative that the primary cause of variance from expected reception is random noise rather than NTSC co-channel interference. Insofar as the particular digital television receiver is concerned, reception would be better were precoding and post-coding not employed in the system, and it is presumed that the broadcaster has not employed precoding. If the minimum result of comparison with the input signal has more energy than the minimum result of comparison with the output signal from the NTSC suppression filter, this is indicative that the primary cause of variance from expected reception is NTSC co-channel interference rather than random noise. Insofar as the particular digital television receiver is concerned, reception would be better were precoding and post-coding employed in the system, and it is presumed that the broadcaster has not employed precoding.

U.S. Pat. No. 5,546,132 issued Aug. 13, 1996 to K. S. Kim et alii and entitled "NTSC INTERFERENCE DETECTOR" describes the use of post-coder comb filtering for suppressing co-channel NTSC interference when the presence of such interference is detected in NTSC-extraction comb filter response to the I channel. The specification and drawing of U.S. Pat. No. 5,546,132 are incorporated herein by reference.

U.S. Pat. No. 5,546,132 does not specifically describe an imaginary or quadrature-phase baseband component (Q channel) of a complex output signal being supplied from the demodulator used in a digital HDTV receiver. A digital HDTV receiver that synchrodynes the VSB AM signals to baseband commonly employs a demodulator that includes an in-phase synchronous detector for supplying received I-channel signal for trellis decoding (after post-coding, if precoding is used at the transmitter) and further includes a quadrature-phase synchronous detector for supplying received Q-channel signal. The received Q-channel signal is lowpass filtered to generate an automatic frequency and phase control (AFPC) signal for the local oscillator supplying carrier for synchrodyning. The specification and drawing of U.S. Pat. No. 5,479,449 issued Dec. 26, 1996 to C. B. Patel and A. L. R. Limberg, entitled "DIGITAL VSB DETECTOR WITH BANDPASS PHASE TRACKER, AS FOR INCLUSION IN AN HDTV RECEIVER", and assigned to Samsung Electronics Co., Ltd., is incorporated herein by reference. The reader's attention is specifically directed to elements 22–27 in FIG. 1 of the drawing of U.S. Pat. No. 5,479,449 and the description thereof in the accompanying specification. These elements are used in the described HDTV receiver for carrying out complex demodulation of the VSB AM final intermediate-frequency signal. U.S. Pat. No. 5,479,449 describes complex demodulation of the VSB AM final I-F signal being carried out in the digital regime, but complex demodulation of the VSB AM final I-F signal is carried out in the analog regime instead in alternative digital TV receiver designs.

In both U.S. Pat. Nos. 5,260,793 and 5,546,132 post-coding is enabled during times of substantial co-channel NTSC interference and otherwise disabled, with the control signal for such selective enablement being developed from the received I-channel signal. The determination of co-channel NTSC interference levels is complicated by the direct bias accompanying the co-channel NTSC interference, which direct bias arises from the in-phase synchronous detection of the pilot carrier of the VSB AM digital HDTV signal. This is particularly a problem in HDTV receivers in which automatic gain control does not tightly regulate the amplitude of the received I-channel signal recovered by in-phase synchronous detection.

The video carrier of an NTSC signal is 1.25 MHz from edge of the 6-MHz-wide broadcast channel, while the carrier for a digital HDTV signal for terrestrial through-the-air broadcast is 675 kHz from edge of the 6-MHz-wide broadcast channel. A co-channel NTSC signal does not exhibit symmetrical amplitude-modulation sidebands with respect to the carrier of the vestigial-sideband amplitude-modulation (VSB AM) carrying digital information. Accordingly, the NTSC video carrier at 575 kHz remove from digital HDTV signal carrier and its sideband at further remove from digital HDTV signal carrier are not well canceled in the digital HDTV signal. Nor, of course, is the NTSC audio carrier at 5.075 MHz remove from digital HDTV signal carrier.

NTSC co-channel interference will appear in the imaginary or quadrature-phase baseband component (Q channel) of the complex output signal of a demodulator used in a digital high-definition television (HDTV) receiver whenever NTSC co-channel interference appears in its real or in-phase baseband component (I channel). Accordingly, as described by the inventor in his U.S. patent application Ser. No. 08/724,799 filed Oct. 2, 1996 entitled "NTSC INTERFERENCE DETECTORS FOR DIGITAL HDTV RECEIVERS, OPERATING RESPONSIVE TO RECEIVED Q-CHANNEL SIGNALS", an NTSC interference detector described in U.S. Pat. No. 5,546,132 can be modified to apply the received Q-channel signal, rather than the received I-channel signal, to its NTSC extracting filter. By determining whether or not a significant amount of NTSC co-channel interference accompanies the received Q-channel signal, one inferentially determines whether or not a significant amount of NTSC co-channel interference accompanies the received I-channel signal, such as to cause too many errors in the trellis decoding of equalized received I-channel signal to be corrected by the Reed-Solomon decoder following the trellis decoder. The accurate determination of co-channel NTSC interference levels is simplified, because essentially no direct bias arises from the quadrature-phase synchronous detection of the pilot carrier of the VSB AM digital HDTV signal.

The NTSC interference detector described in U.S. Pat. No. 5,546,132 uses an NTSC-extracting comb filter of the type additively combining two differentially delayed digital HDTV signals, with the differential delay chosen such that the differentially delayed beats between HDTV carrier and NTSC video carrier occurring at 57.5 times data line frequency (which data line frequency corresponds to NTSC horizontal scan line frequency) constructively combine. The zero-frequency component of I-channel signal, which is generated by synchronous detection of the pilot carrier for digital television, also constructively combines in the response of such a comb filter, giving rise to a direct-bias term that complicates the determination of co-channel NTSC interference levels, as pointed out above.

SUMMARY OF THE INVENTION

An object of the invention is to modify the NTSC interference detectors of U.S. Pat. No. 5,546,132 to replace their NTSC-extracting comb filters, the responses of which filters undesirably include direct-bias terms arising from the synchronous detection of digital television pilot carrier, with NTSC-extracting comb filters the responses of which do not include direct-bias terms arising from the synchronous detection of digital television pilot carrier.

Post-coder selection circuitry that embodies the invention is incorporated within a digital high-definition television receiver that includes a demodulator for extracting a received I-channel baseband signal susceptible of being accompanied at times by respective co-channel interfering NTSC signal components. The post-coder selection circuitry uses an NTSC interference detector for controlling the selection of whether post-coding is to precede trellis decoding in an HDTV receiver. The NTSC interference detector is one of several novel types having an NTSC extracting filter for supplying an NTSC extracting filter response that separates accompanying co-channel interfering NTSC signal component from the received I-channel baseband signal including its direct bias component. More particularly, the NTSC extracting filter that characterizes the invention employs differential delay and a subtractor for differentially combining the differentially delayed responses to the I-channel baseband signal in order to suppress direct bias arising from synchronous detection of the digital TV pilot signal. The NTSC interference detector further includes a comparing portion for periodically integrating the NTSC extracting filter response and deciding whether the co-channel interfering NTSC signal component from the I-channel baseband signal is above a first reference value or not. The NTSC interference detector also includes a control signal generator for accumulating the signal supplied from the comparing portion for each integration period, deciding the presence or absence of the co-channel interfering NTSC signal components according to a second reference value, and supplying a control signal having first or second condition according to the presence or absence respectively of the co-channel interfering NTSC signal component. A post-coder for the received I-channel signal is enabled in response to the first condition of the control signal and disabled in response to the second condition of the control signal.

DETAILED DESCRIPTION OF THE PREFERRED EMBODIMENT

Figure 1:
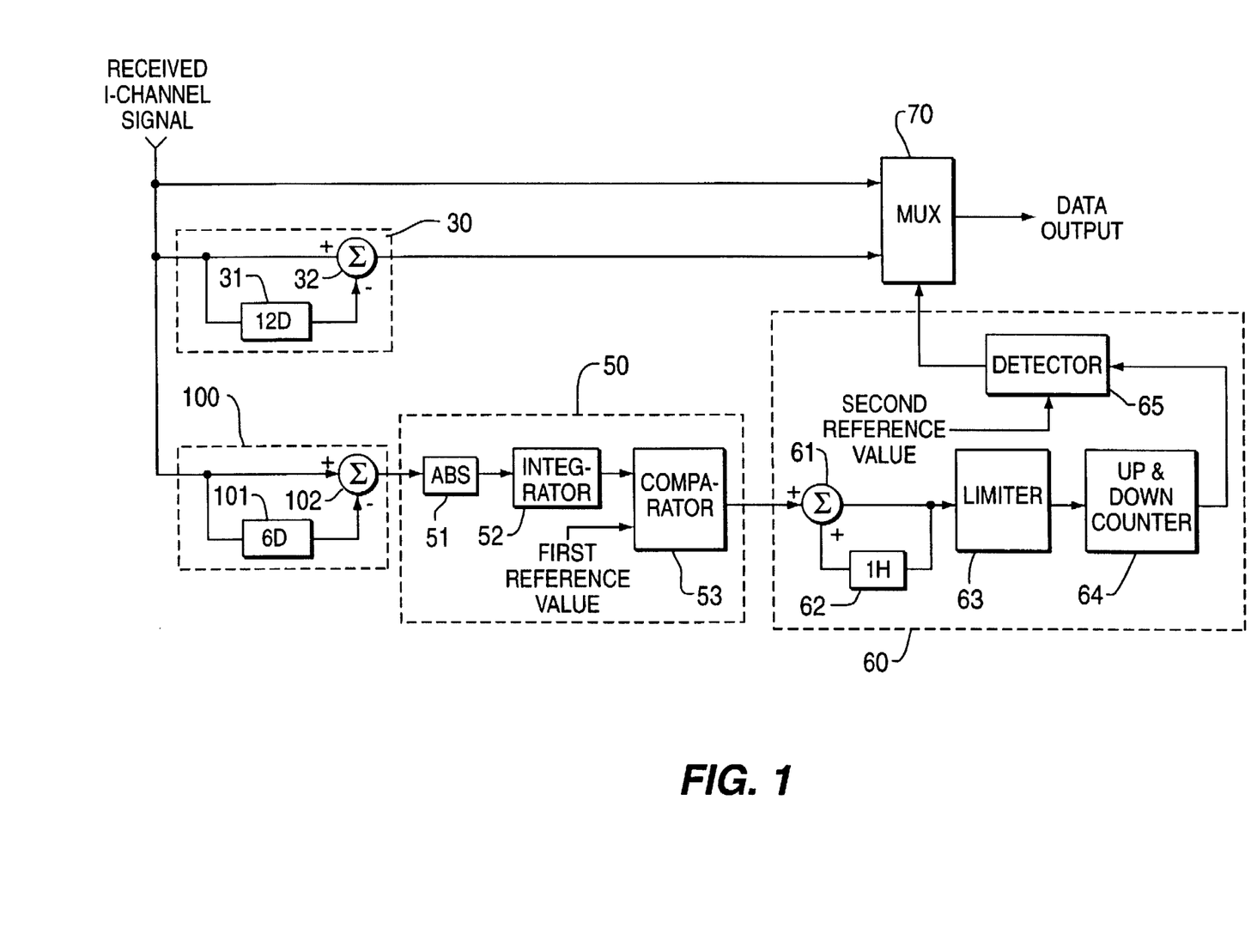
FIG. 1 is a block diagram of post-coder selection circuitry constructed in accordance with the invention.

FIG. 1 shows post-coder selection circuitry, the elements of which correspond to the similarly numbered elements of drawing FIG. 5 of U.S. Pat. No. 5,546,132. The FIG. 1 post-coder selection circuitry differs from that shown in drawing FIG. 5 of U.S. Pat. No. 5,546,132, however, in that the NTSC extracting filter 40 is replaced by an NTSC extracting filter 100, generating a response to the received I-channel signal that is supplied to the comparing portion 50 as its input signal. The output connection of the comparing portion 50 to a control signal generator 60 is similar to that in drawing FIG. 5 of U.S. Pat. No. 5,546,132. The connections of an NTSC removing filter 30, a control signal generator 60 and a multiplexer 70 in the FIG. 2 post-coder selection circuitry are similar to those in drawing FIG. 5 of U.S. Pat. No. 5,546,132.

NTSC extracting filter 100 uses a delay circuit 101 for differentially delaying the received I-channel signal by six symbol periods and a subtractor 102 for differentially combining the resulting differentially delayed I-channel signals. NTSC extracting filter 100 differs from the NTSC extracting filter 40 of U.S. Pat. No. 5,546,132 and from its FIG. 7 NTSC extracting filter in that the use of the subtractor 102 causes the NTSC extracting filter 100 to be non-responsive to the direct-bias component of the received I-channel signal. The six symbol periods of delay provided by the delay circuit 101 causes the video carrier beats at 57.5 times data line frequency to be substantially oppositely phased in the differentially delayed I-channel signals, so their differential combination by the subtractor 102 is constructive, rather than destructive in the difference output signal supplied by the subtractor 102 to the comparing portion 50 as its input signal in the FIG. 1 post-coder selection circuitry.

Figure 2:
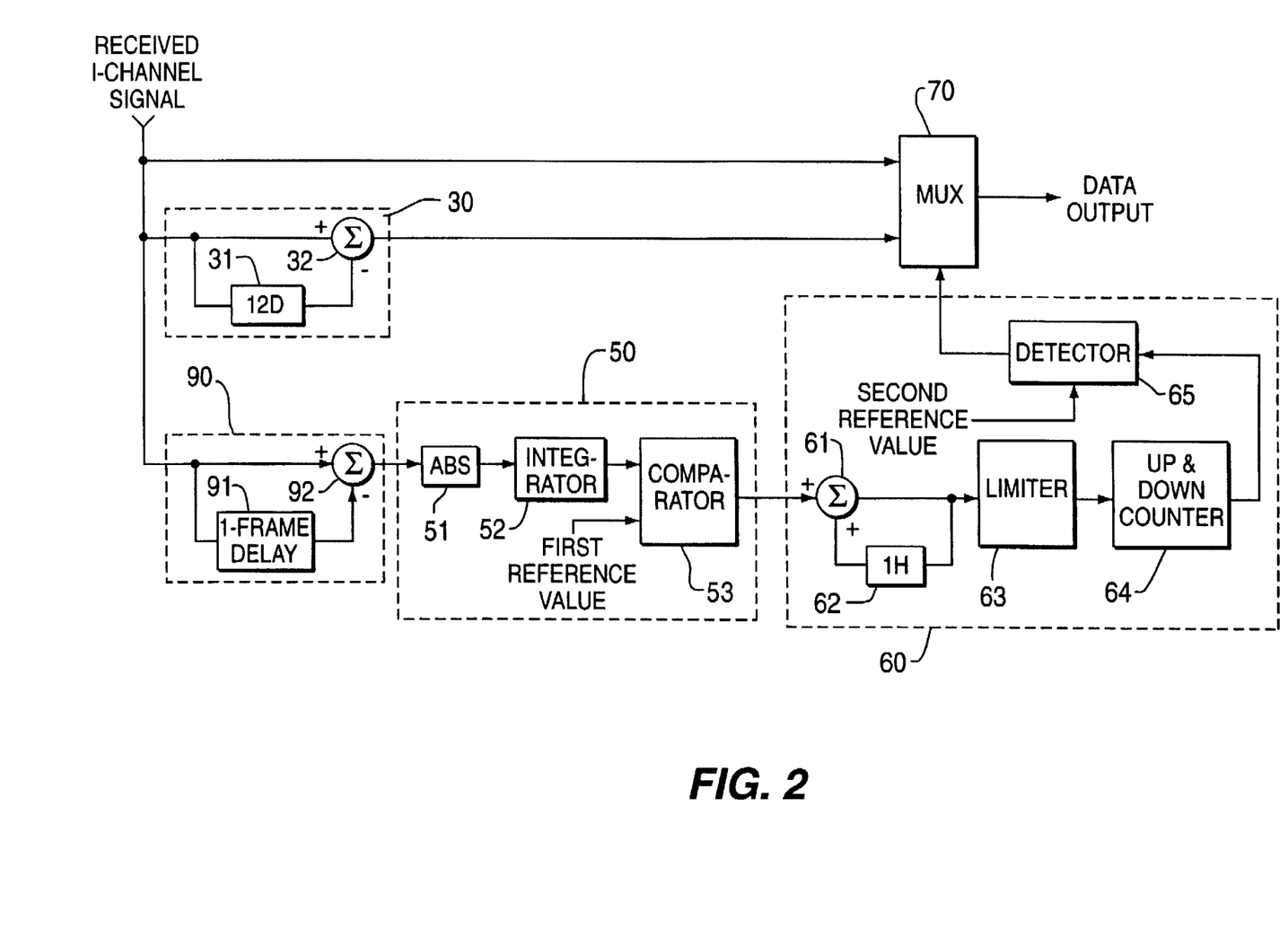
FIG. 2 is a block diagram of alternative post-coder selection circuitry constructed in accordance with the invention.

FIG. 2 shows alternative post-coder selection circuitry, modifying the FIG. 1 post-coder selection circuitry to replace the NTSC extracting filter 100 with an NTSC extracting filter 90 in which differentially delayed by a single data frame are subtractively combined. The NTSC extracting filter 90 includes a 1-video frame delay 91, which corresponds with a 1-display-frame delay for NTSC video signal and can be not too expensively realized using dynamic random-access memory (DRAM) arranged for read-then-write-over operation. The NTSC extracting filter 90 further includes a digital subtractor 92, the use of which causes the NTSC extracting filter 90 to be non-responsive to the direct-bias component of the received I-channel signal. The one-frame delay provided by the delay circuit 101 causes the video carrier beats at 57.5 times data line frequency to be substantially oppositely phased in the differentially delayed I-channel signals, so their differential combination by the subtractor 92 is constructive, rather than destructive in the difference output signal supplied by the subtractor 92 to the comparing portion 50 as its input signal in the FIG. 2 post-coder selection circuitry.

Figure 3:
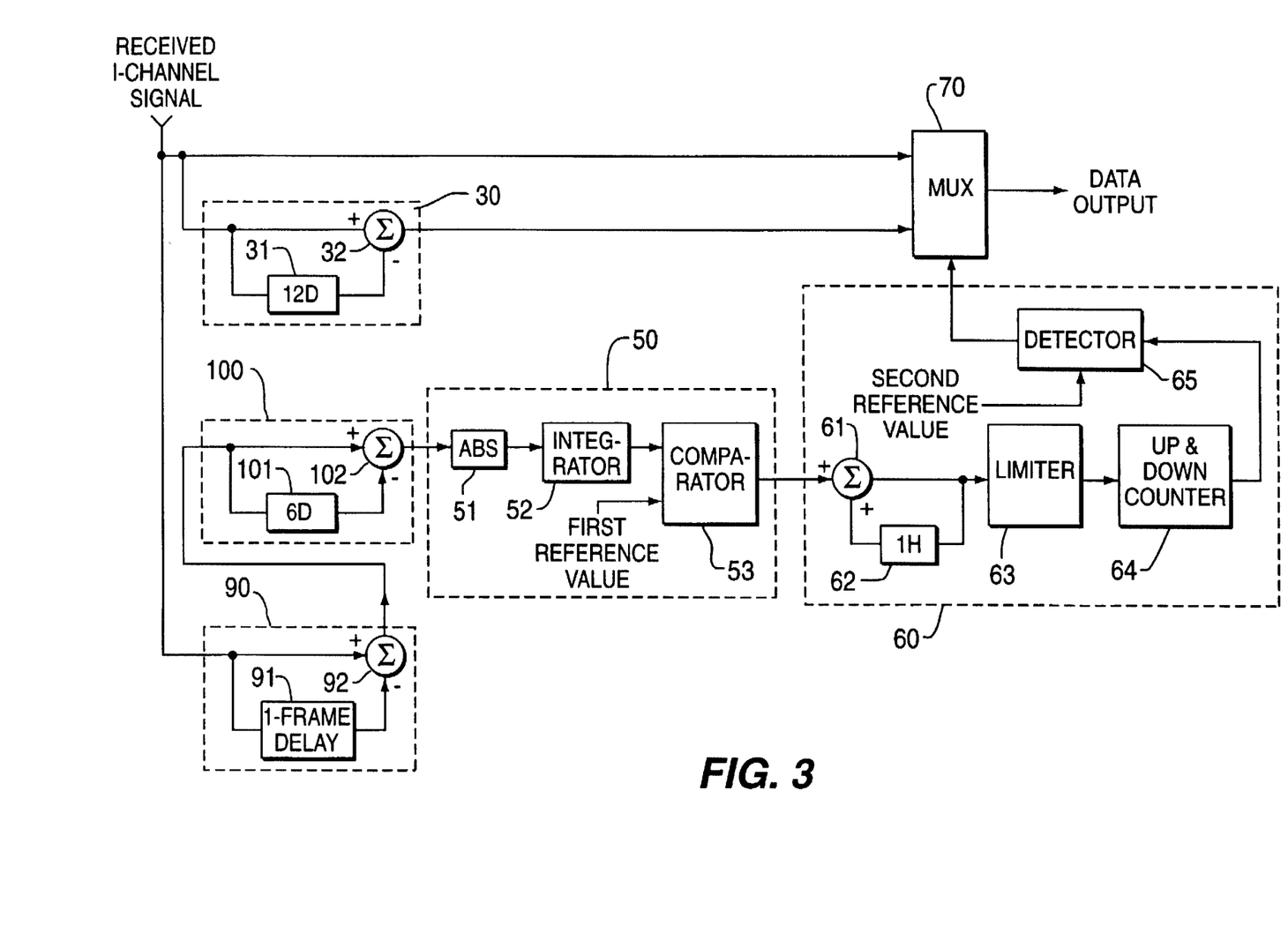
FIGS. 3 and 4 are block diagrams of still further post-coder selection circuitry constructed in accordance with the invention.

FIG. 3 shows a modification of the FIG. 1 post-coder selection circuitry in which the NTSC extracting filter 90 has the NTSC extracting filter 100 inserted in cascade thereafter.

Figure 4:
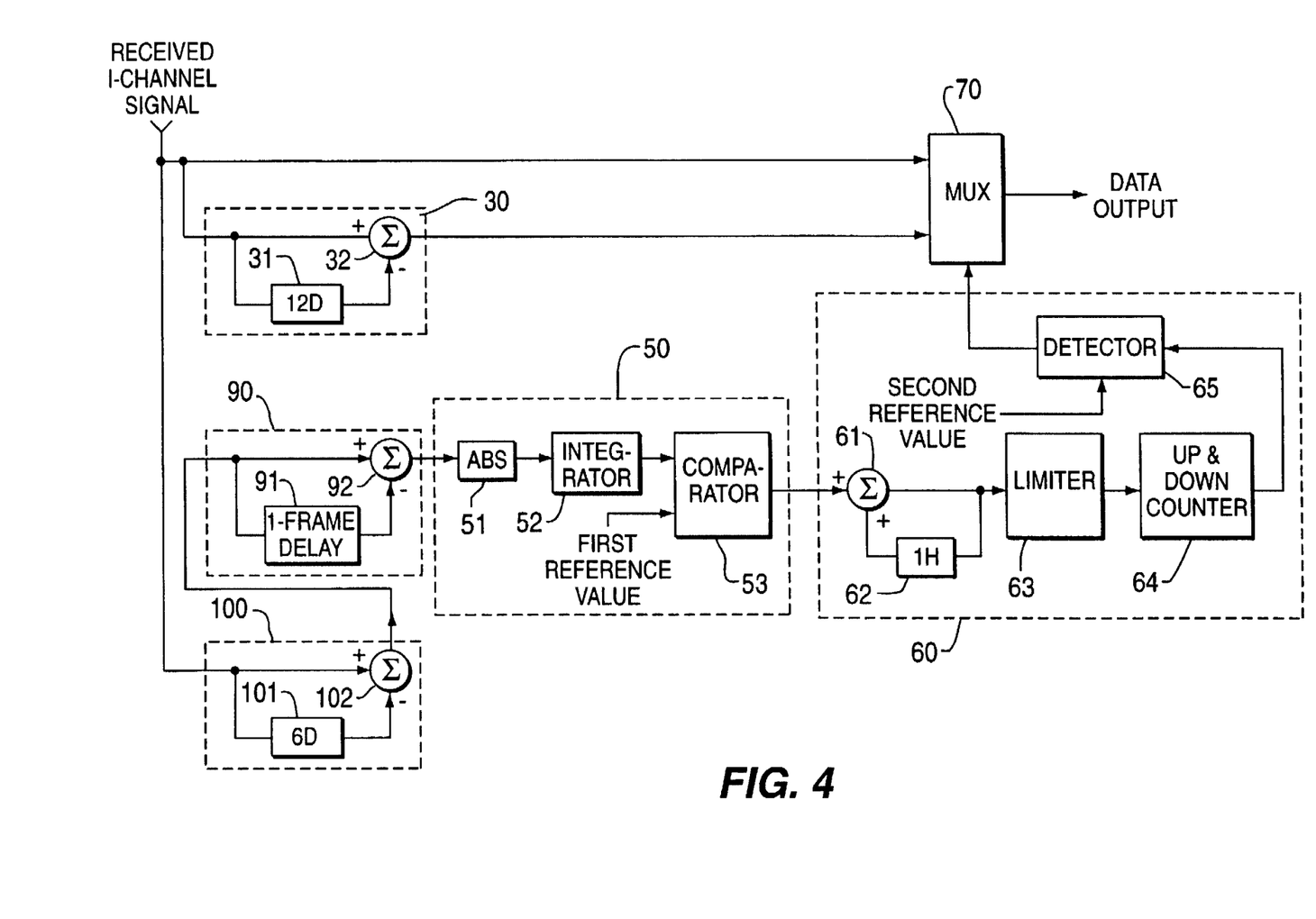

FIG. 4 shows a modification of the FIG. 1 post-coder selection circuitry in which the NTSC extracting filter 90 has the NTSC extracting filter 100 inserted in cascade therebefore.

The integrator 52 in the comparing portion 50 integrates during a substantial portion of each data scan line except those containing data field sync in the FIG. 2 and FIG. 3 post-coder selection circuitry. This substantial portion can be the entire data line in the FIG. 2, FIG. 3 or FIG. 4 post-coder selection circuitry. In the FIG. 1 post-coder selection circuitry integration time should not be started until ten or more samples into the data line, thus to exclude the delayed line sync code sequence from the integration process. In the FIG. 1, FIG. 2, FIG. 3 or FIG. 4 post-coder selection circuitry the comparator 53 response is strobed to the control signal generator 60 during each line sync interval except any immediately preceding a data scan line containing data field sync, and then the integrator 52 is reset.

Post-coder selection circuitry using the NTSC extracting filter 100 in cascade with the FIG. 7 NTSC extracting filter of U.S. Pat. No. 5,546,132 is a further construction in accordance with the invention. Post-coder selection circuitry using the NTSC extracting filter 40 of U.S. Pat. No. 5,546,132 in cascade with the NTSC extracting filter 90 is a further construction in accordance with the invention. One skilled in television receiver design and acquainted with the foregoing disclosure will be enabled to design further variants of the preferred embodiments described therein; and the broader ones of the claims which follow should be liberally construed to include such variants within their scope.

What is claimed is:

1. An NTSC interference detector incorporated within a digital high-definition television receiver including a demodulator for extracting a received I-channel baseband signal susceptible of being accompanied at times by respective co-channel interfering NTSC signal components, said NTSC interference detector comprising:

an NTSC extracting filter for supplying an NTSC extracting filter response that separates accompanying co-channel interfering NTSC signal component from said received I-channel baseband signal including a direct bias component thereof, said NTSC extracting filter including a comb filter, said comb filter including a delay circuit for supplying in response to said received I-channel baseband signal differentially delayed signals with a prescribed amount of differential delay, said comb filter further including a subtractor for differentially combining said differentially delayed signals to generate the response of said comb filter;

a comparing portion for periodically integrating said NTSC extracting filter response and deciding whether said co-channel interfering NTSC signal component separated from said received I-channel baseband signal is above a first reference value or not; and a control signal generator for accumulating the signal supplied from said comparing portion for each integration period, deciding the presence or absence of said co-channel interfering NTSC signal components according to a second reference value, and supplying a control signal according to the presence or absence of said co-channel interfering NTSC signal component in said received I-channel baseband signal.

2. An NTSC interference detector incorporated within a digital high-definition television receiver including a demodulator for extracting a received I-channel baseband signal susceptible of being accompanied at times by respective co-channel interfering NTSC signal components, said NTSC interference detector comprising:

an NTSC extracting filter for supplying an NTSC extracting filter response that separates accompanying co-channel interfering NTSC signal component from said received I-channel baseband signal and an accompanying direct bias signal, said NTSC extracting filter including a delay circuit for differentially delaying said received I-channel baseband signal for six symbol periods, and a subtractor for differentially combining the resulting differentially delayed baseband I-channel signals to generate the response of said NTSC extracting filter;

a comparing portion for periodically integrating said NTSC extracting filter response and deciding whether said co-channel interfering NTSC signal component separated from said received I-channel baseband signal is above a first reference value or not; and a control signal generator for accumulating the signal supplied from said comparing portion for each integration period, deciding the presence or absence of said co-channel interfering NTSC signal components according to a second reference value, and supplying a control signal according to the presence or absence of said co-channel interfering NTSC signal component in said received I-channel baseband signal.

3. An NTSC interference detector incorporated within a digital high-definition television receiver including a demodulator for extracting a received I-channel baseband signal susceptible of being accompanied at times by respective co-channel interfering NTSC signal components, said NTSC interference detector comprising:

an NTSC extracting filter for supplying an NTSC extracting filter response that separates accompanying co-channel interfering NTSC signal component from said received I-channel baseband signal and an accompanying direct bias signal, said NTSC extracting filter including a first delay circuit for differentially delaying said received I-channel baseband signal for six symbol periods, a first subtractor for differentially combining the resulting differentially delayed baseband I-channel signals to generate a first subtractor response, a second delay circuit for differentially delaying said first subtractor response for an interval substantially corresponding to one NTSC display frame, and a second subtractor for differentially combining the resulting differentially delayed first subtractor responses to generate a second subtractor response used as the response of said NTSC extracting filter;

a comparing portion for periodically integrating said NTSC extracting filter response and deciding whether said co-channel interfering NTSC signal component separated from said received I-channel baseband signal is above a first reference value or not; and a control signal generator for accumulating the signal supplied from said comparing portion for each integration period, deciding the presence or absence of said co-channel interfering NTSC signal components according to a second reference value, and supplying a control signal according to the presence or absence of said co-channel interfering NTSC signal component in said received I-channel baseband signal.

4. An NTSC interference detector as claimed in claim 1, wherein said delay circuit included in said comb filter differentially delays said received I-channel baseband signal for an interval substantially corresponding to one NTSC display frame.

5. An NTSC interference detector incorporated within a digital high-definition television receiver including a demodulator for extracting a received I-channel baseband signal susceptible of being accompanied at times by respective co-channel interfering NTSC signal components, said NTSC interference detector comprising:

an NTSC extracting filter for supplying an NTSC extracting filter response that separates accompanying co-channel interfering NTSC signal component from said received I-channel baseband signal and an accompanying direct bias signal, said NTSC extracting filter including a first delay circuit for differentially delaying said received I-channel baseband signal for an interval substantially corresponding to one NTSC display frame, a first subtractor for differentially combining the resulting differentially delayed baseband I-channel signals to generate a first subtractor response, a second delay circuit for differentially delaying said first subtractor response for six symbol periods, and a second subtractor for differentially combining the resulting differentially delayed first subtractor responses to generate a second subtractor response used as the response of said NTSC extracting filter;

a comparing portion for periodically integrating said NTSC extracting filter response and deciding whether said co-channel interfering NTSC signal component separated from said received I-channel baseband signal is above a first reference value or not; and a control signal generator for accumulating the signal supplied from said comparing portion for each integration period, deciding the presence or absence of said co-channel interfering NTSC signal components according to a second reference value, and supplying a control signal according to the presence or absence of said co-channel interfering NTSC signal component in said received I-channel baseband signal.

6. An NTSC interference detector as claimed in claim 1, wherein said comparing portion comprises:

an absolute value circuit for taking the absolute value of the response supplied from said NTSC extracting filter;

an integrator for integrating the signal supplied from said absolute value circuit for a predetermined period; and a comparator for comparing the signal supplied from said integrator with said first reference value.

7. An NTSC interference detector as claimed in claim 1, wherein said control signal generator comprises:

an adder for adding for each data line interval the signal supplied from said comparing portion and applied to said adder as a first addend input signal thereof;

a delay circuit for delaying the sum output signal supplied from said adder for a data line interval and supplying the delayed signal to said adder as a second addend input signal thereof;

a limiter for limiting the sum output signal supplied from said adder to generate a limited-range response;

an up/down counter for counting up or down according to an up/down command responsive to whether the limited-range response from said limiter is positive or negative; and a detector for comparing the signal supplied from said up/down, counter with said second reference value to generate a control signal indicative of the presence or absence of said co-channel interfering NTSC signal component in said received I-channel baseband signal.

8. Post-coder selection circuitry incorporated within a digital high-definition television receiver including a demodulator for extracting a received I-channel baseband signal susceptible of being accompanied at times by respective co-channel interfering NTSC signal components, said post-coder selection circuitry comprising:

an NTSC extracting filter for supplying an NTSC extracting filter response that separates accompanying co-channel interfering NTSC signal component from said received I-channel baseband signal including a direct bias component thereof, said NTSC extracting filter including a comb filter, said comb filter including a delay circuit for supplying in response to said received I-channel baseband signal differentially delayed signals with a prescribed amount of differential delay, and said comb filter further including a subtractor for differentially combining said differentially delayed signals to generate the response of said comb filter;

a comparing portion for periodically integrating said NTSC extracting filter response and deciding whether said co-channel interfering NTSC signal component from said I-channel baseband signal is above a first reference value or not;

a control signal generator for accumulating the signal supplied from said comparing portion for each integration period, deciding the presence or absence of said co-channel interfering NTSC signal components according to a second reference value, and supplying a control signal having a first condition or a second condition according to the presence or absence respectively of said co-channel interfering NTSC signal component in said received I-channel baseband signal; and a post-coder for said received I-channel signal enabled in response to the first condition of said control signal and disabled in response to the second condition of said control signal.

9. Post-coder selection circuitry incorporated within a digital high-definition television receiver including a demodulator for extracting a received I-channel baseband signal susceptible of being accompanied at times by respective co-channel interfering NTSC signal components, said post-coder selection circuitry comprising:

an NTSC extracting filter for supplying an NTSC extracting filter response that separates accompanying co-channel interfering NTSC signal component from said received I-channel baseband signal including a direct bias component thereof, said NTSC extracting filter including a delay circuit for differentially delaying said received I-channel baseband signal for six symbol periods, and a subtractor for differentially combining the resulting differentially delayed baseband I-channel signals to generate the response of said NTSC extracting filter;

a comparing portion for periodically integrating said NTSC extracting filter response and deciding whether said co-channel interfering NTSC signal component from said I-channel baseband signal is above a first reference value or not;

a control signal generator for accumulating the signal supplied from said comparing portion for each integration period, deciding the presence or absence of said co-channel interfering NTSC signal components according to a second reference value, and supplying a control signal having a first condition or a second condition according to the presence or absence respectively of said co-channel interfering NTSC signal component in said received I-channel baseband signal; and a post-coder for said received I-channel signal enabled in response to the first condition of said control signal and disabled in response to the second condition of said control signal.

10. Post-coder selection circuitry as claimed in claim 9, wherein said post-coder for said received I-channel signal enabled in response to the first condition of said control signal and disabled in response to the second condition of said control signal comprises:

an NTSC removing filter responsive to said received I-channel baseband signal for generating a post-coded I-channel signal; and a multiplexer controlled by said control signal for supplying one of first and second possible output signals for said post-coder selection circuitry, said multiplexer being responsive to the first condition of said control signal for supplying said first possible output signal for said post-coder selection circuitry as its actual output signal corresponding to said post-coded I-channel signal, and said multiplexer being responsive to the second condition of said control signal for supplying said second possible output signal for said post-coder selection circuitry as its actual output signal corresponding to said received I-channel signal.

11. Post-coder selection circuitry incorporated within a digital high-definition television receiver including a demodulator for extracting a received I-channel baseband signal susceptible of being accompanied at times by respective co-channel interfering NTSC signal components, said post-coder selection circuitry comprising:

an NTSC extracting filter for supplying an NTSC extracting filter response that separates accompanying co-channel interfering NTSC signal component from said received I-channel baseband signal including a direct bias component thereof, said NTSC extracting filter including a first delay circuit for differentially delaying said received I-channel baseband signal for six symbol periods, a first subtractor for differentially combining the resulting differentially delayed baseband I-channel signals to generate a first subtractor response, a second delay circuit for differentially delaying said first subtractor response for an interval substantially corresponding to one NTSC display frame, and a second subtractor for differentially combining the resulting differentially delayed first subtractor responses to generate a second subtractor response used as the response of said NTSC extracting filter;

a comparing portion for periodically integrating said NTSC extracting filter response and deciding whether said co-channel interfering NTSC signal component from said I-channel baseband signal is above a first reference value or not;

a control signal generator for accumulating the signal supplied from said comparing portion for each integration period, deciding the presence or absence of said co-channel interfering NTSC signal components according to a second reference value, and supplying a control signal having a first condition or a second condition according to the presence or absence respectively of said co-channel interfering NTSC signal component in said received I-channel baseband signal; and a post-coder for said received I-channel signal enabled in response to the first condition of said control signal and disabled in response to the second condition of said control signal.

12. Post-coder selection circuitry as claimed in claim 11, wherein said post-coder for said received I-channel signal enabled in response to the first condition of said control signal and disabled in response to the second condition of said control signal comprises:

an NTSC removing filter responsive to said received I-channel baseband signal for generating a post-coded I-channel signal; and a multiplexer controlled by said control signal for supplying one of first and second possible output signals for said post-coder selection circuitry, said multiplexer being responsive to the first condition of said control signal for supplying said first possible output signal for said post-coder selection circuitry as its actual output signal corresponding to said post-coded I-channel signal, and said multiplexer being responsive to the second condition of said control signal for supplying said second possible output signal for said post-coder selection circuitry as its actual output signal corresponding to said received I-channel signal.

13. Post-coder selection circuitry as claimed in claim 8, wherein said delay circuit included in said comb filter differentially delays said received I-channel baseband signal for an interval substantially corresponding to one NTSC display frame.

14. Post-coder selection circuitry as claimed in claim 13, wherein said post-coder for said received I-channel signal enabled in response to the first condition of said control signal and disabled in response to the second condition of said control signal comprises:

an NTSC removing filter responsive to said received I-channel baseband signal for generating a post-coded I-channel signal; and a multiplexer controlled by said control signal for supplying one of first and second possible output signals for said post-coder selection circuitry, said multiplexer being responsive to the first condition of said control signal for supplying said first possible output signal for said post-coder selection circuitry as its actual output signal corresponding to said post-coded I-channel signal, and said multiplexer being responsive to the second condition of said control signal for supplying said second possible output signal for said post-coder selection circuitry as its actual output signal corresponding to said received I-channel signal.

15. Post-coder selection circuitry incorporated within a digital high-definition television receiver including a demodulator for extracting a received I-channel baseband signal susceptible of being accompanied at times by respective co-channel interfering NTSC signal components, said post-coder selection circuitry comprising:

an NTSC extracting filter for supplying an NTSC extracting filter response that separates accompanying co-channel interfering NTSC signal component from said received I-channel baseband signal including a direct bias component thereof, said NTSC extracting filter including a first delay circuit for differentially delaying said received I-channel baseband signal for an interval substantially corresponding to one NTSC display frame, a first subtractor for differentially combining the resulting differentially delayed baseband I-channel signals to generate a first subtractor response, a second delay circuit for differentially delaying said first subtractor response for six symbol periods, and a second subtractor for differentially combining the resulting differentially delayed first subtractor responses to generate a second subtractor response used as the response of said NTSC extracting filter;

a comparing portion for periodically integrating said NTSC extracting filter response and deciding whether said co-channel interfering NTSC signal component from said I-channel baseband signal is above a first reference value or not;

a control signal generator for accumulating the signal supplied from said comparing portion for each integration period, deciding the presence or absence of said co-channel interfering NTSC signal components according to a second reference value, and supplying a control signal having a first condition or a second condition according to the presence or absence respectively of said co-channel interfering NTSC signal component in said received I-channel baseband signal; and a post-coder for said received I-channel signal enabled in response to the first condition of said control signal and disabled in response to the second condition of said control signal.

16. Post-coder selection circuitry as claimed in claim 15, wherein said post-coder for said received I-channel signal enabled in response to the first condition of said control signal and disabled in response to the second condition of said control signal comprises:

an NTSC removing filter responsive to said received I-channel baseband signal for generating a post-coded I-channel signal; and a multiplexer controlled by said control signal for supplying one of first and second possible output signals for said post-coder selection circuitry, said multiplexer being responsive to the first condition of said control signal for supplying said first possible output signal for said post-coder selection circuitry as its actual output signal corresponding to said post-coded I-channel signal, and said multiplexer being responsive to the second condition of said control signal for supplying said second possible output signal for said post-coder selection circuitry as its actual output signal corresponding to said received I-channel signal.

17. Post-coder selection circuitry as claimed in claim 8, wherein said comparing portion comprises:

an absolute value circuit for taking the absolute value of the response supplied from said NTSC extracting filter;

an integrator for integrating the signal supplied from said absolute value circuit for a predetermined period; and a comparator for comparing the signal supplied from said integrator with said first reference value.

18. Post-coder selection circuitry as claimed in claim 8, wherein said control signal generator comprises:

an adder for adding for each data line interval the signal supplied from said comparing portion and applied to said adder as a first addend input signal thereof;

a delay circuit for delaying the sum output signal supplied from said adder for a data line interval and supplying the delayed signal to said adder as a second addend input signal thereof;

a limiter for limiting the sum output signal supplied from said adder to generate a limited-range response;

an up/down counter for counting up or down according to an up/down command responsive to whether the limited-range response from said limiter is positive or negative; and a detector for comparing the signal supplied from said up/down, counter with said second reference value to generate a control signal indicative of the presence or absence of said co-channel interfering NTSC signal component in said received I-channel baseband signal.

* * * * *